(12) United States Patent
Kuwahara et al.

(10) Patent No.: US 8,185,283 B2
(45) Date of Patent: May 22, 2012

(54) OUTPUT TORQUE CALCULATING APPARATUS AND CALCULATING METHOD

(75) Inventors: Seiji Kuwahara, Toyota (JP); Toshiya Oishi, Toyota (JP); Shogo Matsumoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 132 days.

(21) Appl. No.: 12/490,473

(22) Filed: Jun. 24, 2009

(65) Prior Publication Data

US 2010/0004835 A1 Jan. 7, 2010

(30) Foreign Application Priority Data

Jul. 1, 2008 (JP) ............................... JP2008-172538

(51) Int. Cl.
*G06F 19/00* (2011.01)

(52) U.S. Cl. ................ 701/59; 701/58; 701/51; 701/53; 701/54; 701/67; 477/43; 477/45; 477/176

(58) Field of Classification Search .................... 701/59, 701/58, 51, 53, 54, 67; 477/43, 45, 176; 123/339, 350; 318/139
See application file for complete search history.

(56) References Cited

U.S. PATENT DOCUMENTS

| | | | |
|---|---|---|---|
| 5,524,724 A * | 6/1996 | Nishigaki et al. ............. | 180/176 |
| 6,085,143 A * | 7/2000 | Przymusinski et al. ...... | 701/110 |
| 6,138,636 A * | 10/2000 | Kohno et al. ............... | 123/198 F |
| 6,188,950 B1 * | 2/2001 | Tsutsumi et al. ............... | 701/96 |
| 6,272,414 B1 * | 8/2001 | Takahashi et al. ............... | 701/54 |
| 6,327,531 B1 * | 12/2001 | Philipp et al. ................. | 701/115 |
| 6,702,715 B2 * | 3/2004 | Eguchi et al. ................. | 477/158 |
| 6,785,598 B2 * | 8/2004 | Schiele ........................... | 701/51 |
| 6,840,341 B2 * | 1/2005 | Fujikawa .................... | 180/65.25 |
| 6,871,133 B2 * | 3/2005 | Togai et al. .................... | 701/104 |
| 6,945,906 B2 * | 9/2005 | Eguchi et al. .................... | 477/45 |
| 7,340,336 B2 * | 3/2008 | Yasui et al. ...................... | 701/67 |
| 7,346,442 B2 * | 3/2008 | Higashimata et al. .......... | 701/67 |
| 7,558,659 B2 * | 7/2009 | Takamatsu et al. ............. | 701/51 |
| 7,568,991 B2 * | 8/2009 | Inuta ............................. | 475/120 |
| 7,601,094 B2 * | 10/2009 | Dickinson ....................... | 477/78 |
| 7,689,339 B2 * | 3/2010 | Takamatsu ...................... | 701/54 |
| 7,792,623 B2 * | 9/2010 | Kuwahara et al. .............. | 701/54 |
| 2002/0116099 A1 * | 8/2002 | Tabata et al. .................... | 701/22 |
| 2010/0004835 A1 * | 1/2010 | Kuwahara et al. .............. | 701/59 |

FOREIGN PATENT DOCUMENTS

| | | | |
|---|---|---|---|
| EP | 1619098 A2 * | 1/2006 | |
| EP | 1624173 A2 | 2/2006 | |
| JP | 5321708 A | 12/1993 | |
| JP | 2003120801 | 4/2003 | |
| JP | 2006046177 | 2/2006 | |
| JP | 2007198157 A | 8/2007 | |

* cited by examiner

*Primary Examiner* — Thomas G. Black
*Assistant Examiner* — Wae Louie
(74) *Attorney, Agent, or Firm* — Gifford, Krass, Sprinkle, Anderson & Citkowski, P.C.

(57) ABSTRACT

First target torque of an engine is set based on a driver's operation, a vehicle behavior, and a request for shifting gears of an automatic transmission. The engine is controlled such that the difference between the first target torque and the actual output torque of the engine is reduced. Detection torque is calculated from an operation state of the engine. In consideration of dead time in control of the engine, calculation torque is calculated from the first target torque. In addition, first lookahead torque with the dead time in the engine being removed is calculated by feedback-correcting the first target torque according to an error e between the detection torque and the calculation torque.

8 Claims, 10 Drawing Sheets

FIG.3

| | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGED
× RELEASED
◎ ENGAGED DURING ENGINE BRAKING
△ ENGAGED ONLY WHEN DRIVING

OUTPUT TORQUE CALCULATING APPARATUS AND CALCULATING METHOD

This nonprovisional application is based on Japanese Patent Application No. 2008-172538 filed on Jul. 1, 2008 with the Japan Patent Office, the entire contents of which are hereby incorporated by reference.

BACKGROUND OF THE INVENTION

1. Field of the Invention

The present invention relates to an output torque calculating apparatus and an output torque calculating method, and more particularly to a technique of calculating output torque with dead time in a driving source being removed.

2. Description of the Background Art

Automatic transmissions for automatically shifting gears are conventionally known. An automatic transmission forms, for example, a gear corresponding to a combination of engaged friction engagement elements among a plurality of friction engagement elements. The engaging force of the friction engagement elements is determined according to hydraulic pressure supplied to the friction engagement elements. In other words, the automatic transmission is hydraulically operated. The hydraulic pressure is generated, for example, by an oil pump driven by an engine.

In order to improve fuel efficiency, it is desired to reduce load on the oil pump as much as possible. In order to reduce load on the oil pump, the hydraulic pressure supplied to the friction engagement elements is reduced. However, if the hydraulic pressure supplied to the friction engagement elements is too low, the friction engagement elements may slip. Therefore, it is desired to realize such hydraulic pressure that is neither too low nor too high for output torque of the engine by exactly grasping input torque of the automatic transmission, that is, output torque of the engine.

Japanese Patent Laying-Open No. 2006-46177 discloses an engine torque calculating method including the steps of: calculating first engine torque based on an engine speed and an ignition timing of each cylinder; and calculating second engine torque used to control an automatic transmission by smoothing the first engine torque, based on a variation amount of the ignition timing of each cylinder.

According to the torque calculating method disclosed in Japanese Patent Laying-Open No. 2006-46177, the first engine torque (actual engine indicated torque) is calculated based on an engine speed. The second engine torque (actual engine net torque) is calculated, for example, by a smoothing process of repeatedly calculating the actual engine indicated torque and adding an addition value calculated based on a difference between the actual engine indicated torque calculated last time and the actual engine indicated torque calculated this time, to the actual engine indicated torque calculated last time. When the variation amount of the ignition timing is large, the addition value is reduced as compared with when it is small. Accordingly, even when the variation amount of the actual engine indicated torque is large, it is possible to calculate the actual engine net torque that varies smoothly, because of the smoothing process. Therefore, a rapid change of the actual engine net torque can be prevented. As a result, it is possible to calculate the torque that is preferred in controlling the automatic transmission.

Here, a certain time is required to adjust hydraulic pressure for use in control of the automatic transmission, to the desired hydraulic pressure. Therefore, the exact hydraulic pressure is not always obtained for the output torque obtained based on an operation state of the engine. If the output torque changes during adjustment of hydraulic pressure, even when the hydraulic pressure reaches a target value, that hydraulic pressure may be too high or too low for the output torque at that time. Thus, in order to accurately match the output torque of the engine with the hydraulic pressure for use in control of the automatic transmission, it is desirable to grasp the future output torque in advance and adjust beforehand the hydraulic pressure so as not to be too high or too low for the future output torque. However, the actual engine net torque calculated by the torque calculating method disclosed in Japanese Patent Laying-Open No. 2006-46177 is the output toque based on the operation state of the engine during the actual time and is not the future output torque.

SUMMARY OF THE INVENTION

An object of the present invention is to accurately calculate future output torque of a driving source.

A output torque calculating apparatus in accordance with an aspect of the present invention includes: a setting unit for setting target torque of a driving source; a detection unit for detecting an operation state of the driving source; a first calculation unit for calculating first output torque of the driving source according to the operation state of the driving source; and a second calculation unit for calculating, from the target torque, second output torque of the driving source in consideration of dead time in the driving source and calculating, from the target torque, third output torque of the driving source with the dead time in the driving source being removed, by correcting the target torque according to a difference between the first output torque and the second output torque.

According to this configuration, target torque of a driving source is set. The actual output torque of the driving source is realized behind the target torque by the amount of first-order lag and dead time. Furthermore, the actual output torque of the driving source may differ from the target torque under the influence of disturbance (for example, a change in friction resistance). In order to obtain the actual output torque of the driving source, first output torque of the driving source is calculated according to an operation state of the driving source. Accordingly, the first output torque representing the actual output torque of the driving source can be obtained accurately according to the actual operation state of the driving source. Besides the first output torque, second output torque of the driving source in consideration of dead time in the driving source is calculated from the target torque. Therefore, the second output torque representing the actual output torque of the driving source can be obtained through computation. The third output torque of the driving source with the dead time in the driving source being removed is calculated from the target torque by correcting the target torque according to the difference between the first output torque and the second output torque, that is, an error that occurs in computation for calculating the second output torque from the target torque. Thus, the future output torque almost as accurate as the first output torque obtained based on the operation state of the driving source can be obtained earlier by the amount of dead time than the actual output torque of the driving source. As a result, the future output torque of the driving source can be calculated accurately.

Preferably, the setting unit sets first target torque considering different kinds of torques and sets second target torque from which at least any one of the different kinds of torques is removed. The second calculation unit calculates, from the first target torque, the second output torque of the driving source in consideration of the dead time in the driving source and calculates, from the second target torque, third output torque of the driving source with the dead time in the driving source being removed, by correcting the second target torque according to a difference between the first output torque and the second output torque.

According to this configuration, third output torque is calculated from the second target torque from which at least any one of different kinds of torques is removed, according to the difference between the first output torque and the second output torque as calculated using the first target torque considering different kinds of torques. Accordingly, even if the second target torque from which any of different kinds of torques is removed is not realized, output torque almost as accurate as the first output torque obtained from the operation state of the driving source can be obtained earlier by the amount of dead time than the actual output torque of the driving source. Therefore, the output torque to be used for control of hydraulic pressure of the automatic transmission can be obtained, earlier by the amount of dead time, from the target torque from which torque unnecessary for control of hydraulic pressure of the automatic transmission, for example, such as torque transiently requested for reducing shocks during shifting gears is removed. As a result, the automatic transmission can be controlled stably using the output torque from which torque unnecessary for control of hydraulic pressure of the automatic transmission is removed.

Further preferably, the output torque calculating apparatus further includes a third calculation unit for calculating output torque that lags behind the third output torque by a predetermined time.

According to this configuration, output torque is calculated that lags by a predetermined time behind the future output torque obtained earlier by the amount of dead time than the actual output torque of the driving source. Accordingly, the future output torque can be obtained earlier by the amount of a desired time than the actual output torque of the driving source. Therefore, the timing at which torque corresponding to the target torque is realized can be matched accurately with the timing at which control using the future output torque is realized.

Further preferably, the output torque calculating apparatus further includes a learning unit for learning a correction amount corresponding to a difference between the first output torque and the second output torque for each operation state of the driving source. The second calculation unit calculates the third output torque using the learned correction amount.

According to this configuration, the correction amount corresponding to the difference between the first output torque and the second output torque is learned for each operation state of the driving source. By correcting the target torque according to the learned correction amount, the third output torque of the driving source with dead time in the driving source being removed is calculated from the target torque. Accordingly, even when the correction amount corresponding to the difference between the first output torque calculated from the actual operation state of the driving source and the second output torque calculated from the target torque changes according to the operation state of the driving source, the third output torque with dead time in the driving source being removed can be calculated quickly from the target torque. Therefore, a delay that may result from calculation of the correction amount corresponding to the difference between the first output torque and the second output torque can be shortened.

Further preferably, the driving source is an internal combustion engine. The detection unit detects the quantity of air taken into the internal combustion engine. The first calculation unit calculates the first output torque of the internal combustion engine according to the detected quantity of air.

According to this configuration, the first output torque representing the actual output torque of the internal combustion engine can be calculated accurately from the quantity of air taken into the internal combustion engine.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an operation table of the automatic transmission.

DESCRIPTION OF THE PREFERRED EMBODIMENTS

Figure 1:
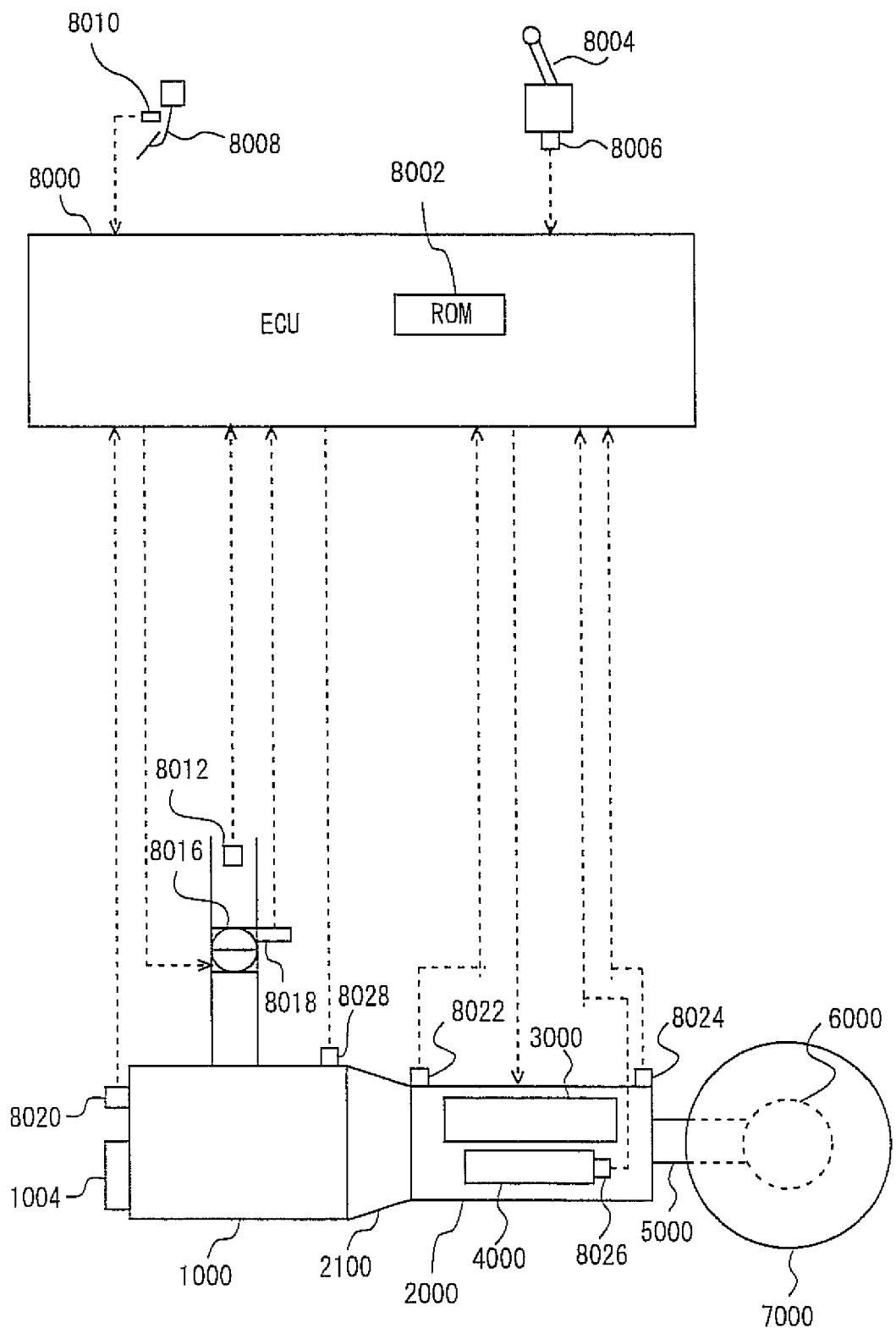
FIG. 1 is a schematic configuration diagram showing a power train of a vehicle.

In the following, an embodiment of the present invention will be described with reference to the figures. In the following description, the same components are denoted with the same reference numerals. They have the same designations and functions. Therefore, a detailed description thereof will not be repeated.

Referring to FIG. 1, a vehicle having a control device in accordance with an embodiment of the present invention will be described. The vehicle is an FR (Front engine Rear drive) vehicle. The vehicle may be the one other than an FR vehicle.

The vehicle includes an engine 1000, an automatic transmission 2000, a torque converter 2100, a planetary gear unit 3000 that forms a part of automatic transmission 2000, a hydraulic circuit 4000 that forms a part of automatic transmission 2000, a propeller shaft 5000, a differential gear 6000, rear wheels 7000, and an ECU (Electronic Control Unit) 8000.

Engine 1000 is an internal combustion engine in which mixture of the air and fuel injected from an injector (not shown) is burnt in a combustion chamber of a cylinder. The combustion allows a piston in the cylinder to be pushed down thereby to rotate a crank shaft. Auxiliary machinery 1004 such as an alternator and an air conditioner is driven by engine 1000. Output torque of engine 1000 (engine torque TE) changes according to an operation amount of an electronic throttle valve 8016, that is, a throttle opening position. In place of or in addition to engine 1000, a motor may be used as a power source. A diesel engine may be used. In a diesel engine, output torque changes according to a valve opening time (operation amount) of an injector, that is, the amount of fuel injection.

Automatic transmission 2000 is coupled to engine 1000 through torque converter 2100. Automatic transmission 2000 forms a desired gear to change the rotational speed of a crank shaft into a desired rotational speed. In place of the automatic transmission that forms a gear, a CVT (Continuously Variable Transmission) that steplessly changes a gear ratio may be mounted. Furthermore, an automatic transmission formed of constant-mesh gears shifted by a hydraulic actuator or an electric motor may be mounted.

Torque output from automatic transmission 2000 is transferred to the right and left rear wheels 7000 through a propeller shaft 5000 and a differential gear 6000.

Connected to ECU 8000 through a harness and the like are a position switch 8006 of a shift lever 8004, an accelerator pedal position sensor 8010 of an accelerator pedal 8008, an airflow meter 8012, a throttle opening position sensor 8018 of electronic throttle valve 8016, an engine speed sensor 8020, an input shaft rotational speed sensor 8022, an output shaft rotational speed sensor 8024, an oil temperature sensor 8026, and a water temperature sensor 8028.

A position of shift lever 8004 (shift position) is detected by position switch 8006, and a signal indicative of the detection result is transmitted to ECU 8000. A gear of automatic transmission 2000 is automatically formed corresponding to a position of shift lever 8004. Alternatively, a manual shift mode may be selected to allow a driver to select any gear according to the driver's operation.

Accelerator pedal position sensor 8010 detects a position of accelerator pedal 8008 to transmit a signal indicative of the detection result to ECU 8000. Airflow meter 8012 detects the quantity of air taken into engine 1000 to transmit a signal indicative of the detection result to ECU 8000.

Throttle opening position sensor 8018 detects an opening position of electronic throttle valve 8016 having its opening position adjusted by an actuator and transmits a signal indicative of the detection result to ECU 8000. The quantity of air taken into engine 1000 is adjusted by electronic throttle valve 8016.

The quantity of air taken into engine 1000 may be adjusted by a variable valve lift system that changes lift amounts or opening/closing phases of an intake valve (not shown) and an exhaust valve (not shown), in place of or in addition to electronic throttle valve 8016.

Engine speed sensor 8020 detects a rotational speed of an output shaft (crank shaft) of engine 1000 (also referred to as engine speed NE hereinafter) and transmits a signal indicative of the detection result to ECU 8000. Input shaft rotational speed sensor 8022 detects an input shaft rotational speed NI of automatic transmission 2000 (turbine rotational speed NT of torque converter 2100) and transmits a signal indicative of the detection result to ECU 8000. Output shaft rotational speed sensor 8024 detects an output shaft rotational speed NO of automatic transmission 2000 and transmits a signal indicative of the detection result to ECU 8000.

Oil temperature sensor 8026 detects a temperature (oil temperature) of oil (ATF: Automatic Transmission Fluid) used for operation and lubrication of automatic transmission 2000 and transmits a signal indicative of the detection result to ECU 8000.

Water temperature sensor 8028 detects a temperature (water temperature) of cooling water of engine 1000 and transmits a signal indicative of the detection result to ECU 8000.

ECU 8000 controls a variety of components such that a vehicle attains a desired driving state, based on signals sent from position switch 8006, accelerator pedal position sensor 8010, airflow meter 8012, throttle opening position sensor 8018, engine speed sensor 8020, input shaft rotational speed sensor 8022, output shaft rotational speed sensor 8024, oil temperature sensor 8026, water temperature sensor 8028, and the like, and a map and a program stored in a ROM (Read Only Memory) 8002.

In the present embodiment, target torque of the engine is set based on the driver's operation (accelerator pedal position, vehicle speed), the behavior of the vehicle, and a request for shifting gears of automatic transmission 2000. More specifically, a driving force of the vehicle is set based on the driver's operation and the behavior of the vehicle, and the driving force is then converted into torque, considering a gear ratio of automatic transmission 2000. Based on the resultant torque, taking torque based on a request for shifting gears of automatic transmission 2000 into consideration, the target torque is set. Engine 1000 is controlled such that the target toque is realized.

The hydraulic control of automatic transmission 2000 is executed based on output torque of engine 1000. It is noted that the control method of engine 1000 and automatic transmission 2000 is not limited the one described above. A program executed by ECU 8000 may be recorded on a recording medium such as CD (Compact Disc) or DVD (Digital Versatile Disc) and distributed in the market. ECU 8000 may be divided into a plurality of ECUs.

In the present embodiment, ECU 8000 controls automatic transmission 2000 such that any one of forward first to eighth gears is formed when a D (drive) range is selected as a shift range of automatic transmission 2000 by placing shift lever 8004 into the D (drive) position. A gear is formed in such a manner that friction engagement elements (clutches and brakes) as described later are engaged in a predetermined combination to couple the input shaft and the output shaft of automatic transmission 2000 with each other. When any one of forward first to eighth gears is formed, torque may be transferred to rear wheels 7000. It is noted that a gear higher than the eighth gear maybe formed in the D range. A gear to be formed is determined based on a transmission diagram created beforehand by experiments or the like using a vehicle speed and an accelerator pedal position as parameters.

When the N (neutral) range or the P (parking) range is selected as a shift range of automatic transmission 2000 by placing shift lever 8004 into the N (neutral) position or the P (parking) position, the friction engagement elements are released to bring automatic transmission 2000 into a neutral state. In the neutral state, the input shaft and the output shaft of automatic transmission 2000 are cut off from each other.

Figure 2:
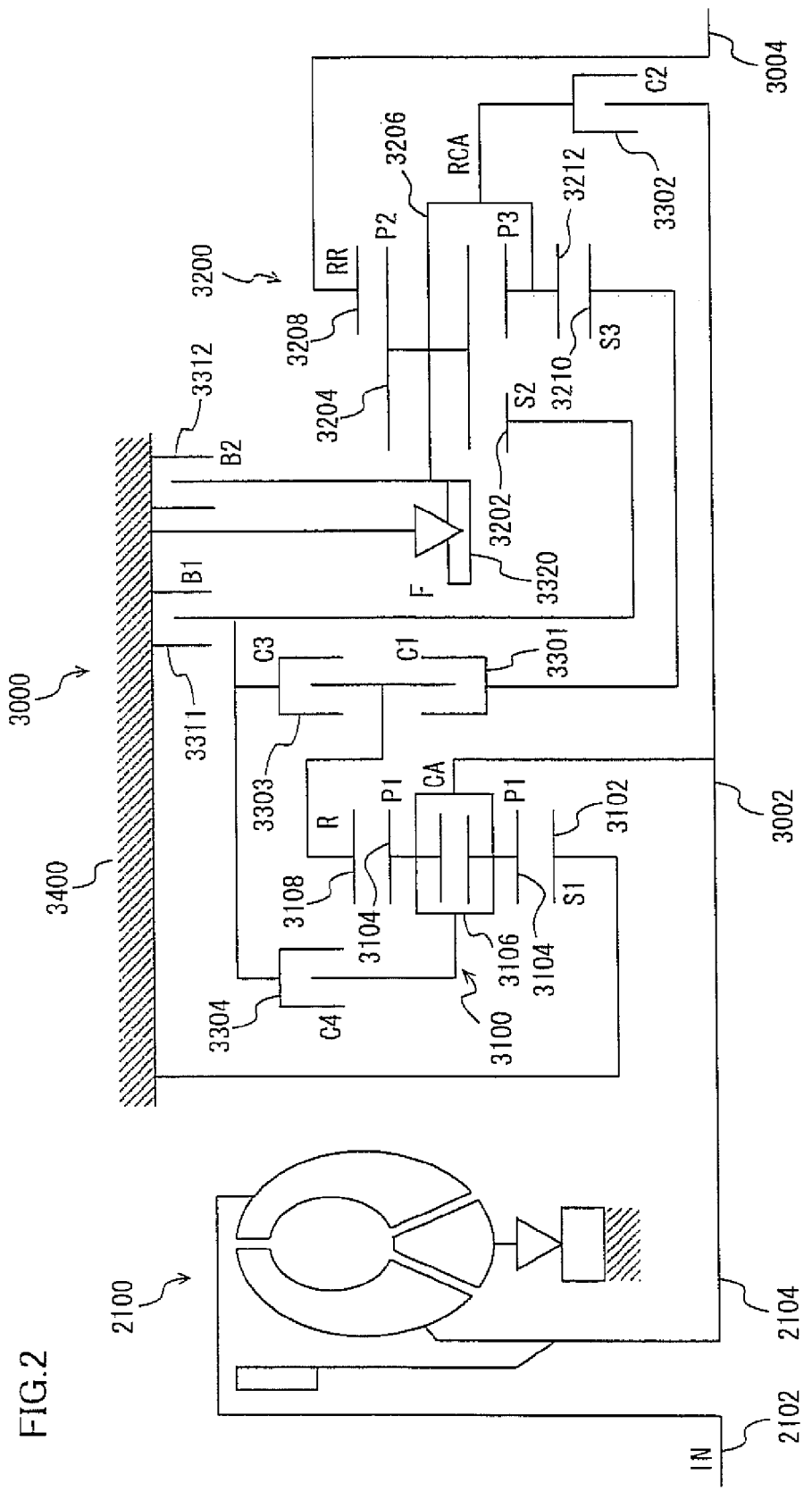
FIG. 2 is a skeleton diagram showing a planetary gear unit of an automatic transmission.

Referring to FIG. 2, planetary gear unit 3000 will be described. Planetary gear unit 3000 is connected to torque converter 2100 having an input shaft 2102 coupled to the crank shaft.

Planetary gear unit 3000 includes a front planetary gear set 3100, a rear planetary gear set 3200, a C1 clutch 3301, a C2 clutch 3302, a C3 clutch 3303, a C4 clutch 3304, a B1 brake 3311, a B2 brake 3312, and a one-way clutch (F) 3320.

Front planetary gear set 3100 is a double pinion type planetary gear train. Front planetary gear set 3100 includes a first sun gear (S1) 3102, a pair of first pinion gears (P1) 3104, a carrier (CA) 3106, and a ring gear (R) 3108.

First pinion gears (P1) 3104 are meshed with first sun gear (S1) 3102 and first ring gear (R) 3108. First carrier (CA) 3106 supports first pinion gears (P1) 3104 such that first pinion gears (P1) 3104 turn around first sun gear (S1) 3102 and rotate on their own axes.

First sun gear (S1) 3102 is fixed to a gear case 3400 such that it cannot rotate. First carrier (CA) 3106 is coupled to an input shaft 3002 of planetary gear unit 3000.

Rear planetary gear set 3200 is a Ravigneaux-type planetary gear train. Rear planetary gear set 3200 includes a second sun gear (S2) 3202, second pinion gears (P2) 3204, a rear carrier (RCA) 3206, a rear ring gear (RR) 3208, a third sun gear (S3) 3210, and third pinion gears (P3) 3212.

Second pinion gears (P2) 3204 are meshed with second sun gear (S2) 3202, rear ring gear (RR) 3208 and third pinion gears (P3) 3212. Third pinion gears (P3) 3212 are meshed with third sun gear (S3) 3210 as well as second pinion gears (P2) 3204.

Rear carrier (RCA) 3206 supports second pinion gears (P2) 3204 and third pinion gears (P3) 3212 such that second pinion gears (P2) 3204 and third pinion gears (P3) 3212 can turn around second sun gear (S2) 3202 and third sun gear (S3) 3210, respectively, and rotate on their own axes. Rear carrier (RCA) 3206 is coupled to one-way clutch (F) 3320. Rear carrier (RCA) 3206 becomes unable to rotate during driving at the first gear (when traveling using a driving force output from engine 1000). Rear ring gear (RR) 3208 is coupled to an output shaft 3004 of planetary gear unit 3000.

One-way clutch (F) 3320 is provided in parallel with B2 brake 3312. More specifically, an outer race of one-way clutch (F) 3320 is fixed to gear case 3400 and an inner race thereof is coupled to rear carrier (RCA) 3206.

FIG. 3 shows an operation table representing the relation between each speed gear and an operation state of each clutch and each brake. The forward first to eighth gears and the reverse first and second gears are formed by operating each brake and each clutch in a combination shown in the operation table.

Figure 4:
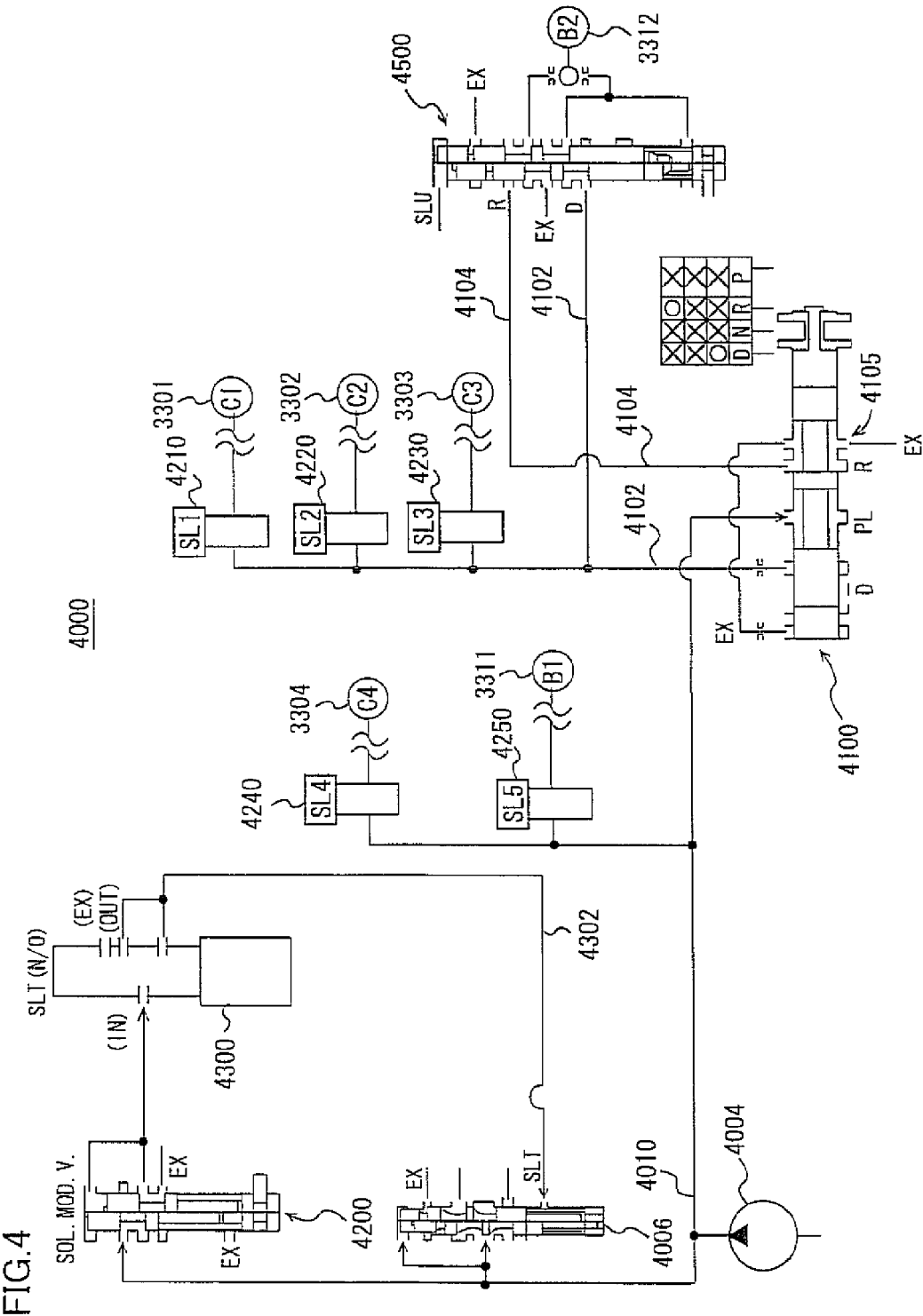
FIG. 4 shows a hydraulic circuit of the automatic transmission.

Referring to FIG. 4, a main part of hydraulic circuit 4000 will be described. It is noted that hydraulic circuit 4000 is not limited to the one described below.

Hydraulic circuit 4000 includes an oil pump 4004, a primary regulator valve 4006, a manual valve 4100, a solenoid modulator valve 4200, an SL1 linear solenoid (referred to as SL(1) hereinafter) 4210, an SL2 linear solenoid (referred to as SL(2) hereinafter) 4220, an SL3 linear solenoid (referred to as SL(3) hereinafter) 4230, an SL4 linear solenoid (referred to as SL(4) hereinafter) 4240, an SL5 linear solenoid (referred to as SL(5) hereinafter) 4250, an SLT linear solenoid (referred to as SLT hereinafter) 4300, and a B2 control valve 4500.

Oil pump 4004 is coupled to the crank shaft of engine 1000. The crank shaft rotates to drive oil pump 4004 to generate hydraulic pressure. The hydraulic pressure generated in oil pump 4004 is adjusted by primary regulator valve 4006 thereby generating a line pressure.

Primary regulator valve 4006 operates using a throttle pressure adjusted by SLT 4300 as a pilot pressure. The line pressure is supplied to manual valve 4100 through a line pressure oil passage 4010.

Manual valve 4100 includes a drain port 4105. The hydraulic pressure of a D range pressure oil passage 4102 and an R range pressure oil passage 4104 is discharged from a drain port 4105. When the spool of manual valve 4100 is in the D position, line pressure oil passage 4010 and D range pressure oil passage 4102 are brought into communication with each other so that hydraulic pressure is supplied to D range pressure oil passage 4102. Here, R range pressure oil passage 4104 and drain port 4105 are brought into communication with each other so that the R range pressure of R range pressure oil passage 4104 is discharged from drain port 4105.

When the spool of manual valve 4100 is in the R position, line pressure oil passage 4010 and R range pressure oil passage 4104 are brought into communication with each other so that hydraulic pressure is supplied to R range pressure oil passage 4104. Here, D range pressure oil passage 4102 and drain port 4105 are brought into communication with each other so that the D range pressure of D range pressure oil passage 4102 is discharged from drain port 4105.

When the spool of manual valve 4100 is in the N position or the P position, both D range pressure oil passage 4102 and R range pressure oil passage 4104 are brought into communication with drain port 4105 so that the D range pressure of D range pressure oil passage 4102 and the R range pressure of R range pressure oil passage 4104 are discharged from drain port 4105.

The hydraulic pressure supplied to D range pressure oil passage 4102 is finally supplied to C1 clutch 3301, C2 clutch 3302 and C3 clutch 3303. The hydraulic pressure supplied to R range pressure oil passage 4104 is finally supplied to B2 brake 3312.

Solenoid modulator valve 4200 adjusts the hydraulic pressure supplied to SLT 4300 (solenoid modulator pressure) to a constant pressure, using the line pressure as an initial pressure.

SL(1) 4210 adjusts the hydraulic pressure supplied to C1 clutch 3301. SL(2) 4220 adjusts the hydraulic pressure supplied to C2 clutch 3302. SL(3) 4230 adjusts the hydraulic pressure supplied to C3 clutch 3303. SL(4) 4240 adjusts the hydraulic pressure supplied to C4 clutch 3304. SL(5) 4250 adjusts the hydraulic pressure supplied to B1 brake 3311.

SLT 4300 adjusts the solenoid modulator pressure to generate a throttle pressure, in response to a control signal from ECU 8000 based on the accelerator pedal position detected by accelerator pedal position sensor 8010. The throttle pressure is supplied to primary regulator valve 4006 through an SLT oil passage 4302. The throttle pressure is used as the pilot pressure of primary regulator valve 4006.

SL(1) 4210, SL(2) 4220, SL(3) 4230, SL(4) 4240, SL(5) 4250, and SLT 4300 are controlled by control signals sent from ECU 8000.

B2 control valve 4500 selectively supplies the hydraulic pressure from one of D range pressure oil passage 4102 and R range pressure oil passage 4104 to B2 brake 3312. D range pressure oil passage 4102 and R range pressure oil passage 4104 are connected to B2 control valve 4500. B2 control valve 4500 is controlled by the hydraulic pressure supplied from an SLU solenoid valve (not shown) and a spring biasing force.

When the SLU solenoid valve is on, B2 control valve 4500 assumes the state on the left in FIG. 4. In this case, B2 brake 3312 is supplied with the hydraulic pressure obtained by adjusting the D range pressure using the hydraulic pressure supplied from the SLU solenoid valve as a pilot pressure.

When the SLU solenoid valve is off, B2 control valve 4500 assumes the state on the right in FIG. 4. In this case, B2 brake 3312 is supplied with the R range pressure.

Figure 5:
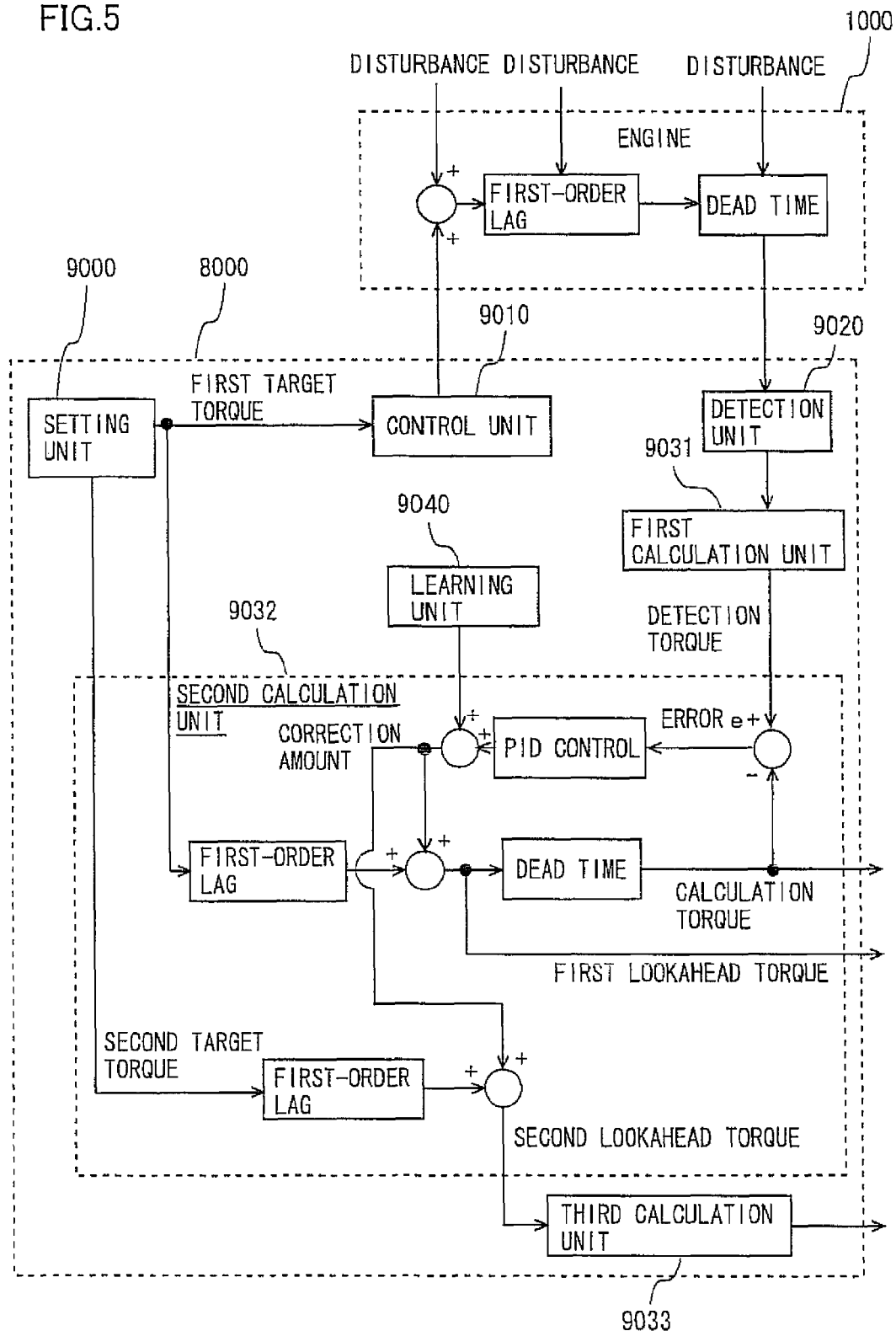
FIG. 5 is a first functional block diagram of ECU.

Referring to FIG. 5, ECU 8000 will be described in more detail. It is noted that each function of ECU 8000 as described below may be realized by hardware or may be realized by software.

ECU 8000 includes a setting unit 9000, a control unit 9010, a detection unit 9020, a first calculation unit 9031, a second calculation unit 9032, a third calculation unit 9033, and a learning unit 9040.

Setting unit 9000 sets first target torque of engine 1000 based on the driver's operation, the behavior of the vehicle, and a request for shifting gears of automatic transmission 2000.

The output torque based on the driver's operation is set by an accelerator pedal position and a vehicle speed in accordance with a predetermined map based on the results of experiments and simulations.

The output torque of engine 1000 is set by VDIM (Vehicle Dynamics Integrated Management), vibration suppression control, cruise control, and the like.

VDIM is a system that integrates VSC (Vehicle Stability Control), TRC (Traction Control), ABS (Anti lock Brake System), EPS (Electronic Power Steering), and the like, and calculates a difference between the driver's driving image according to the operation amounts of accelerator, steering and brake and the vehicle behavior according to sensor information and controls the driving force (output torque of engine 1000) of the vehicle, the brake hydraulic pressure, and the like to reduce the difference.

VSC is such control that ensures the vehicle stability by automatically setting the brake hydraulic pressure of each wheel and the vehicle driving force (output torque of engine 1000) when a sensor detects that the front and rear wheels are likely to skid.

TRC is such control that ensures the optimum driving force by automatically setting the brake hydraulic pressure of each wheel and the vehicle driving force (output torque of engine 1000) when a sensor detects spinning of the drive wheels at a time of starting and acceleration on a slippery road.

ABS is a control system for preventing locking of the wheels by automatically setting the optimum value of the brake hydraulic pressure. EPS is a control system for assisting steering of a steering wheel using a force of an electric motor.

The vibration suppression control is control for setting a driving force (output torque of engine 1000) for suppressing vehicular pitching and bouncing as calculated using a vehicle model from the actual driving force of the vehicle. A conventional technique may be employed for setting a driving force for suppressing vehicular pitching and bouncing, and therefore a detailed description thereof will not be repeated here.

The cruise control is control for setting a driving force (output torque of engine 1000) for keeping a vehicle speed as a predetermined vehicle speed.

In addition, such output torque is set that may realize torque down or torque up for reducing shocks that may occur during shifting gears of automatic transmission 2000.

ECU 8000 sets the final first target torque of engine 1000 by performing arbitration or addition/subtraction of these output torques. For example, the smallest output torque or the largest output torque is selected from the output torque based on the driver's operation and the torque based on the vehicle behavior. The target torque of engine 1000 is set by adding or subtracting the output torque based on a request for shifting gears of automatic transmission 2000, to or from the selected output torque. It is noted that a method of setting the first target torque is not limited to the one described above.

ECU 8000 also sets second target torque obtained by removing at least one of the output torques based on the driver's operation, the vehicle behavior, and a request for shifting gears of automatic transmission 2000.

For example, the second target torque is set by removing the output torque based on a request for shifting gears of automatic transmission 2000. In other words, the second target torque is set based on the driver's operation and the vehicle behavior.

The smallest torque or the largest torque of the output torque based on the driver's operation and the torque based on the vehicle behavior is set as the second target torque. It is noted that a method of setting the second target torque is not limited to the one described above. The second target torque may be set by removing the output torque based on the driver's operation or the vehicle behavior.

Control unit 9010 controls engine 1000 such that the difference between the first target torque and the actual output torque of engine 1000 is reduced. More specifically, the throttle opening position, the ignition timing, the amount of fuel injection, and the like are controlled such that the difference between the actual output torque of engine 1000 and the first target torque is reduced, that is, such that the actual output torque of engine 1000 agrees with the first target torque.

Detection unit 9020 detects an operation state of engine 1000. The detected operation states include the quantity of air taken into engine 1000 (intake quantity), engine speed NE, and the like.

First calculation unit 9031 calculates (estimates) the actual output torque of engine 1000 according to an operation state of engine 1000. For example, the actual output torque of engine 1000 is calculated in accordance with a map having the intake quantity and the engine speed as parameters.

A pressure in an intake manifold may be used in place of the intake quantity. Alternatively, the output torque of engine 1000 may be directly detected by a torque sensor. A well-known general technique may be used for calculating the actual output torque of engine 1000 according to an operation state of engine 1000, and therefore a detailed description thereof will not be repeated here.

The output torque of engine 1000 as calculated based on the detected operation state is also referred to as detection torque hereinafter. First-order lag and dead time in control of engine 1000 are reflected in the detection torque of engine 1000.

Second calculation unit 9032 calculates, from the first target torque, the actual output torque of engine 1000 in consideration of first-order lag and dead time in control of engine 1000. The output torque of engine 1000 as calculated from the first target torque is also referred to as calculation torque hereinafter.

The calculation torque is calculated so that first-order lag and dead time in control of engine 1000 are reflected, for example, in accordance with a map having the operation state such as engine speed NE and the first target torque as parameters.

Second calculation unit 9032 also calculates, from the first target torque, the output torque of engine 1000 with dead time in engine 1000 being removed, by feedback-correcting the first target torque according to an error e between the detection torque and the calculation torque. The output torque of engine 1000 as calculated from the first target torque, with dead time in engine 1000 being removed, is also referred to as first lookahead torque hereinafter.

The correction amount of the first target torque is determined by PID (Proportion Integration Differential) control. More specifically, the correction amount of the first target torque is determined by PID control such that the error e between the detection torque and the calculation torque is reduced. For example, the correction amount is determined to be larger as the error e between the detection torque and the calculation torque, an integrated value of the error e and a differentiated value of the error e are larger. It is noted that a method of determining the correction amount is not limited to the one described above.

Figure 6:
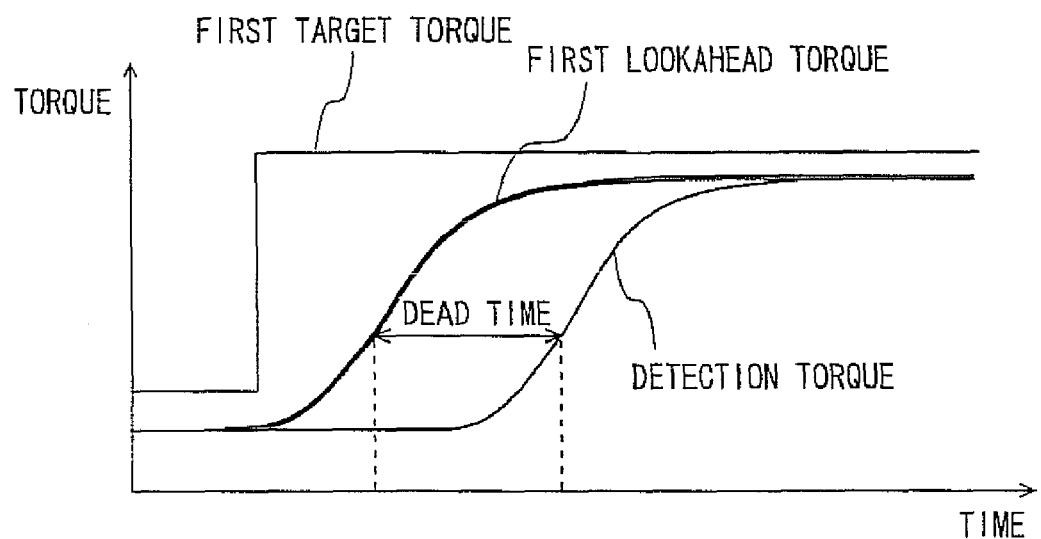
FIG. 6 is a graph showing first target torque, detection torque, and first lookahead torque.

By feedback-correcting the first target torque using the correction amount corresponding to the error e between the detection torque and the calculation torque, as shown in FIG. 6, the future output torque almost as accurate as the detection torque obtained from the operation state of engine 1000 can be obtained as the first lookahead torque, earlier by the amount of dead time than the timing at which torque corresponding to the first target torque is realized. Therefore, the future output torque of engine 1000 can be calculated accurately.

In the present embodiment, the control systems (for example, VSC and the cruise control) other than engine 1000 are controlled using the first lookahead torque. Thus, the control systems can be operated earlier by the amount of dead time in the control systems other than engine 1000. Therefore, it is possible to reduce the difference between the timing at which the output torque corresponding to the first target torque is realized and the timing at which the control in the control systems other than engine 1000 is realized. As a result, the control systems can be operated accurately according to the actual output torque of engine 1000.

Returning to FIG. 5, second calculation unit 9032 further calculates, from the second target torque, the output torque of engine 1000 with dead time in engine 1000 being removed, by correcting the second target torque according to the error e between the detection torque and the calculation torque. The output torque of engine 1000 as calculated from the second target torque, with the dead time in engine 1000 being removed, is also referred to as second lookahead torque hereinafter. First-order lag is reflected in the second lookahead torque.

The correction amount of the second target torque is the same as the correction amount of the first target torque. More specifically, the second lookahead torque is calculated by correcting the second target torque from which the output torque based on a request for shifting gears of automatic transmission 2000 is removed, according to the error e between the detection torque and the calculation torque as calculated using the first target torque including the output torque based on a request for shifting gears of automatic transmission 2000.

This is because it can be assumed that the error between the calculation torque obtained from the second target torque and the detection torque obtained from the operation state of engine 1000 supposing that engine 1000 is controlled such that the second target torque is realized is nearly equal to the error e between the calculation torque obtained from the first target torque and the detection torque obtained when engine 1000 is controlled such that the first target torque is realized.

Accordingly, even if the second target torque is not realized, the output torque almost as accurate as the output torque obtained from the operation state can be obtained as the second lookahead torque earlier than the actual output torque of engine 1000 by the amount of dead time.

Figure 7:
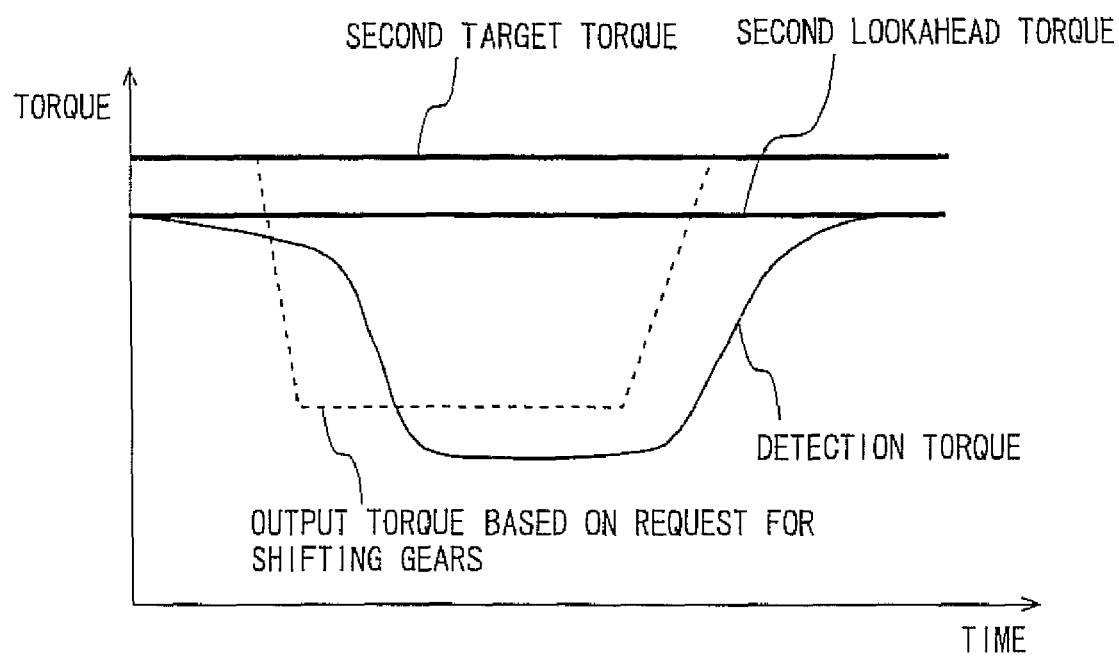
FIG. 7 is a graph showing second target torque, detection torque, and second lookahead torque.

In the present embodiment, the second lookahead torque is calculated from the second target torque from which the output torque based on a request for shifting gears of automatic transmission 2000 is removed. Accordingly, as shown in FIG. 7, the second lookahead torque can be obtained, earlier by the amount of dead time, from the second target torque from which the torque transiently requested to reduce shocks during shifting gears is removed.

The second lookahead torque is used, for example, to determine a line pressure and a hydraulic pressure to be supplied to the friction engagement elements in hydraulic circuit 4000 of automatic transmission 2000. In other words, the line pressure and the hydraulic pressure to be supplied to the friction engagement elements are controlled according to the second lookahead torque. Thus, automatic transmission 2000 can be controlled stably using the second lookahead toque from which torque unnecessary for the control of hydraulic pressure of automatic transmission 2000 is removed.

Returning to FIG. 5, learning unit 9040 learns (stores) the correction amount corresponding to the error e between the detection torque and the calculation torque for each operation state of engine 1000. For example, as shown in FIG. 8, the correction amount corresponding to the error e between the detection torque and the calculation torque is learned for each of regions divided by the first target torque and the detection torque as parameters.

Figure 8:
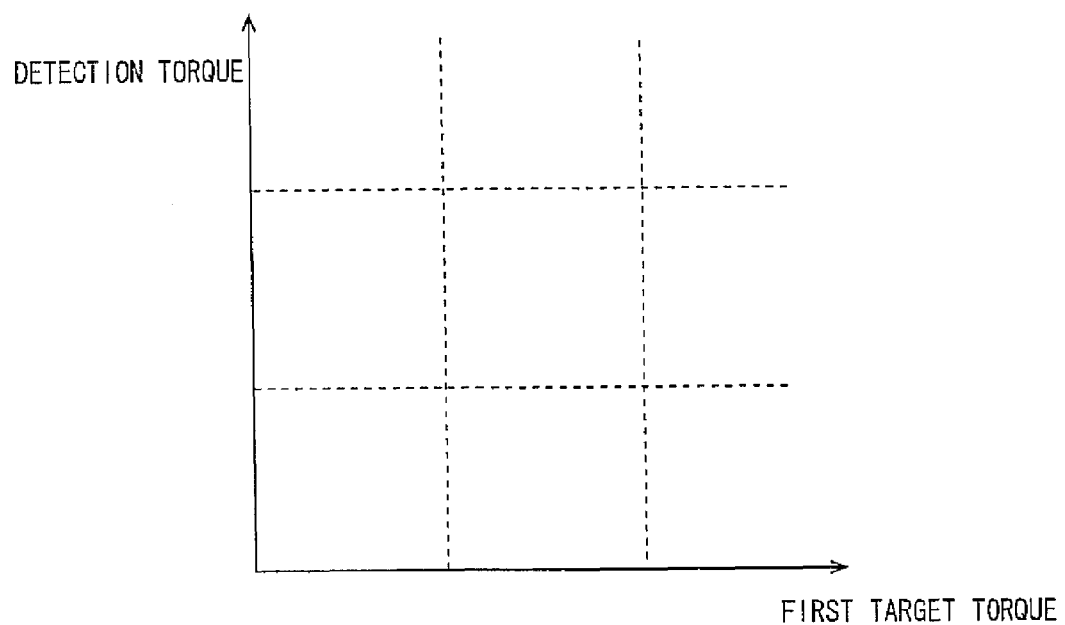
FIG. 8 is a graph showing a region in which a correction amount is learned.

It is noted that the broken lines in FIG. 8 show the boundaries of the regions in each of which the correction amount is learned. Engine speed NE and the load may be used as parameters, in place of or in addition to the first target torque and the detection torque.

Second calculation unit 9032 calculates the first lookahead torque and the second lookahead torque using the correction amount learned for each operation state of engine 1000. In other words, the correction amount learned for each operation state of engine 1000 is added to the correction amount determined by PID control.

Figure 9:
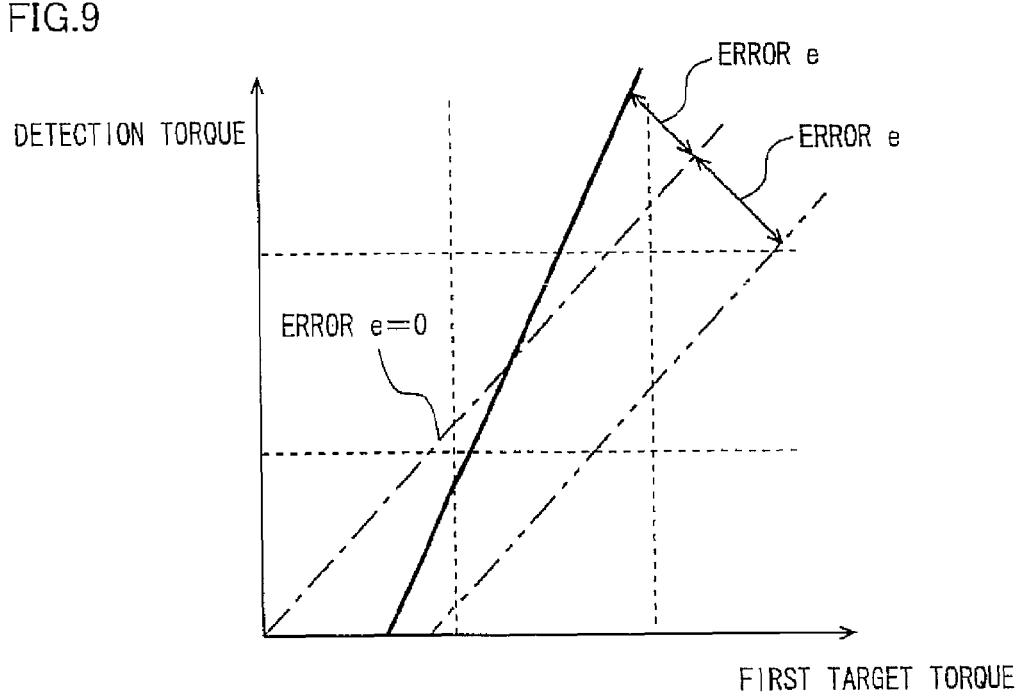
FIG. 9 is a graph showing an error e between the detection torque and the calculation torque.

Accordingly, the first target torque and the second target torque can be corrected quickly even when the correction amount corresponding to the error e between the detection torque and the calculation torque changes, as shown by the solid line in FIG. 9, since the error e between the detection torque and the calculation torque changes according to the operation state of engine 1000. Therefore, the first lookahead torque and the second lookahead torque with dead time in engine 1000 being removed can be calculated quickly from the first target torque and the second target torque. As a result, it is possible to shorten the lag that may result from calculation of the correction amount corresponding to the error e between the detection torque and the calculation torque.

Here, the alternate long and short dashed line in FIG. 9 shows the ideal state in which the error e between the detection torque and the calculation torque is zero. The distance from the broken line in FIG. 9 shows the magnitude of the error e. The chain double-dashed line in FIG. 9 shows the state in which the error e between the detection torque and the calculation torque is nearly constant. When the error e between the detection torque and the calculation torque is nearly constant, the need for successively updating the correction amount is small. Therefore, the same level of the correction amount can be used in almost all the operation states. In this case, the first lookahead torque and the second lookahead torque can be calculated quickly even without learning the correction amount.

Figure 10:
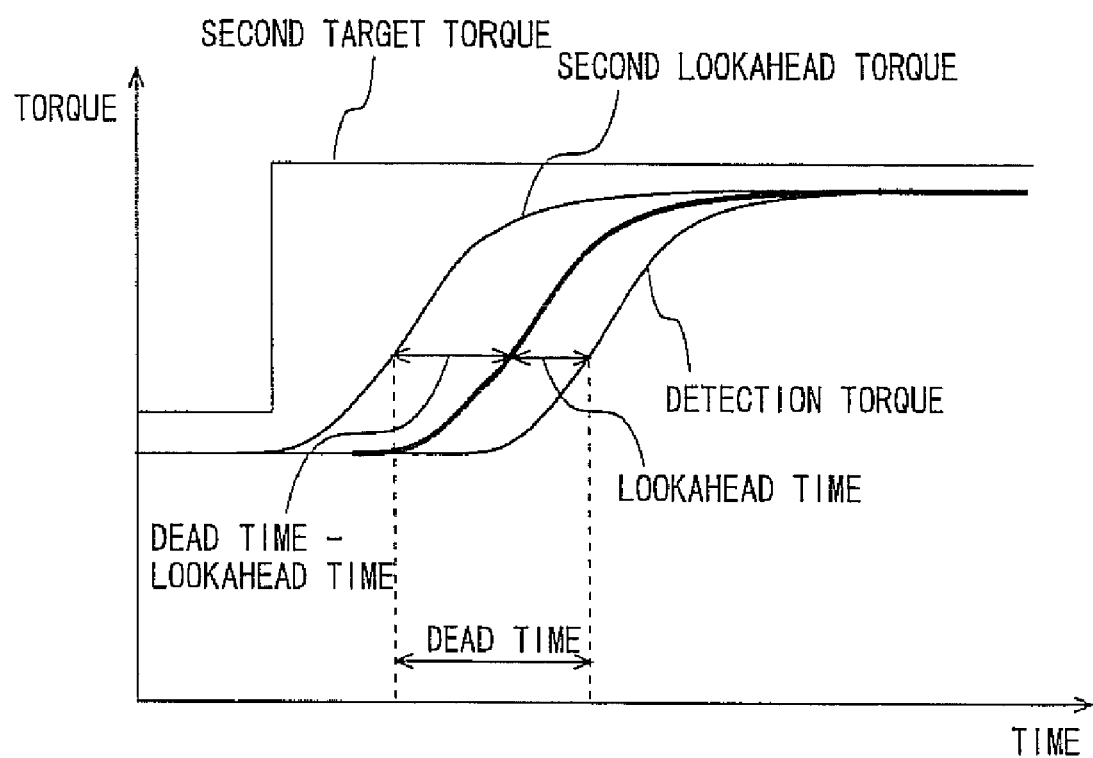
FIG. 10 is a graph showing output torque that lags behind the second lookahead torque by an amount of time obtained by subtracting lookahead time from dead time.

Third calculation unit 9033 calculates the output torque that lags behind the second lookahead torque by the amount of time obtained by subtracting lookahead time from dead time, as shown in FIG. 10. In other words, the output torque that is ahead of the actual output torque by the amount of lookahead time is calculated. Accordingly, the future output torque almost as accurate as the detection torque can be obtained earlier by the amount of the desired time than the actual output torque of engine 1000.

In the present embodiment, the hydraulic pressure of automatic transmission 2000 is controlled based on the output torque that lags behind the second lookahead torque by the amount of time obtained by subtracting lookahead time from dead time. Therefore, the timing at which the actual output torque corresponding to the first target torque is realized can be matched accurately with the timing at which the control using the second lookahead torque is realized.

As described above, according to the output torque calculating apparatus in accordance with the present embodiment, the target torque of the engine is set based on the driver's operation, the vehicle behavior, and a request for shifting gears of the automatic transmission. The engine is controlled such that the difference between the target torque and the actual output torque of the engine is reduced. The detection torque representing the actual output torque of the engine is calculated from the operation state of the engine. In addition, in consideration of dead time of the engine, the calculation torque representing the actual output torque of the engine is calculated from the first target torque, and in addition, the lookahead torque representing the output torque with dead time in the engine being removed is calculated by feedback-correcting the first target torque according to the error e between the detection torque and the calculation torque. Accordingly, the future output torque almost as accurate as the detection torque obtained from the operation state of the engine can be obtained earlier by the amount of the dead time than the timing at which the output torque corresponding to the first target torque is realized. Therefore, the future output torque of the engine can be calculated accurately.

Figure 11:
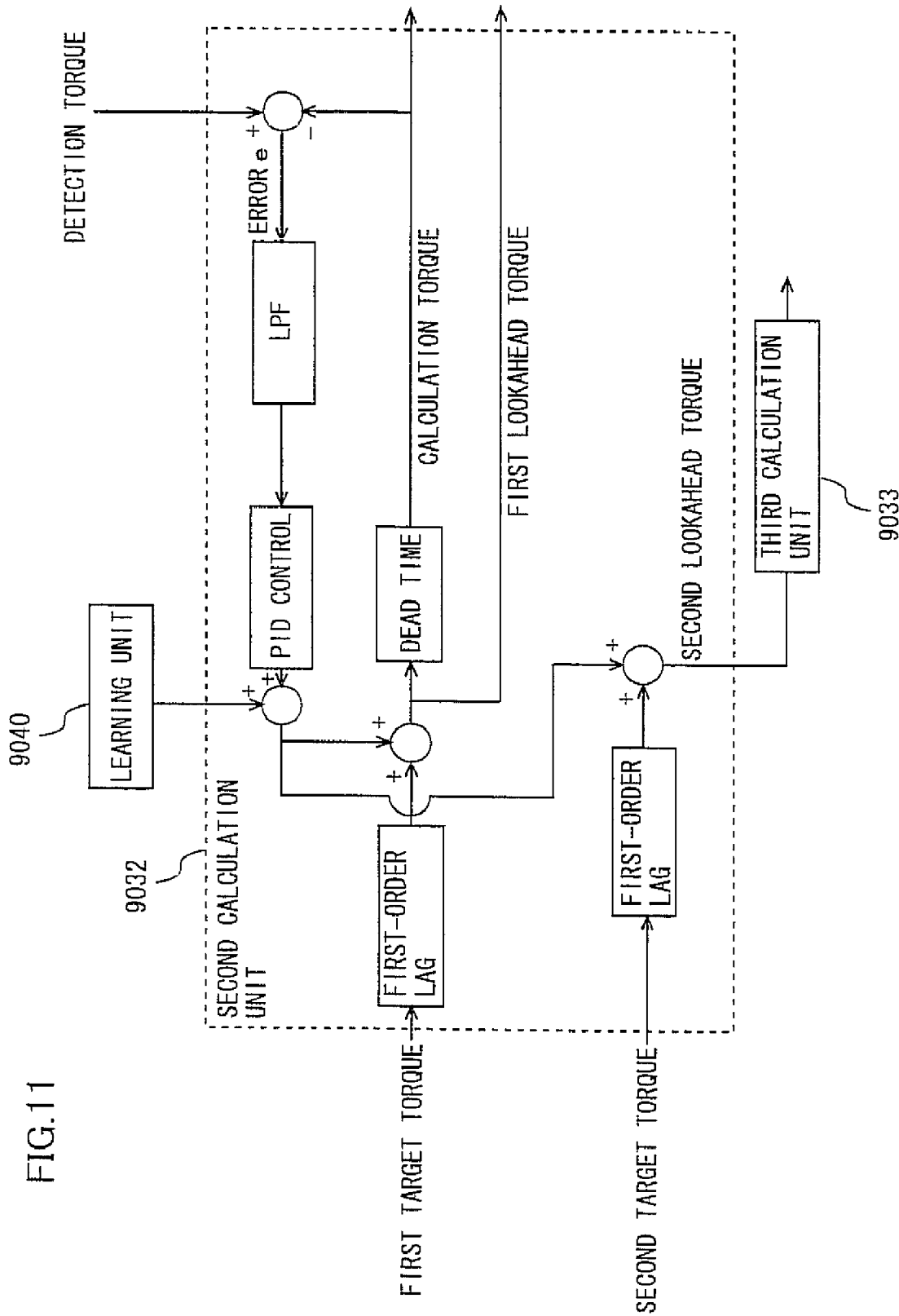
FIG. 11 is a second functional block diagram of ECU.
Figure 12:
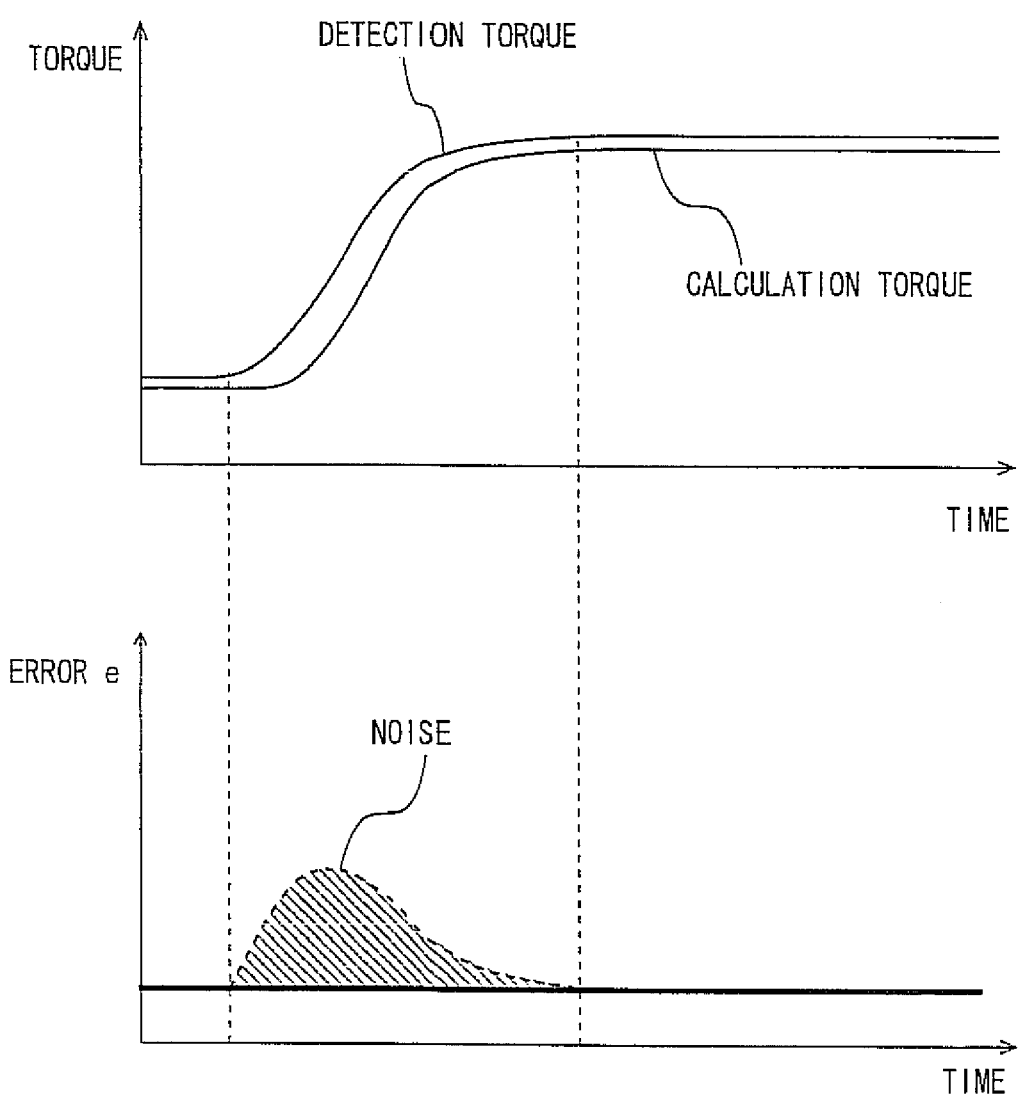
FIG. 12 is a graph showing an error e, from which noise is removed, between the detection torque and the calculation torque.

It is noted that as shown in FIG. 11, the error e between the detection torque and the calculation torque can be passed through a low-pass filter LPF in second calculation unit 9032. By doing so, noise included in the error e between the detection torque and the calculation torque can be removed, as shown in FIG. 12.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An output torque calculating apparatus comprising:
    a setting unit that sets a first target torque considering torques respectively set by a plurality of systems and sets a second target torque considering a plurality of torques excluding at least any one of said torques respectively set by said plurality of systems;
    a detection unit that detects an operation state of a driving source;
    a first calculation unit that calculates a first output torque of said driving source according to the operation state of said driving source; and
    a second calculation unit that calculates, from said first target torque, a second output torque of said driving source in consideration of a dead time in said driving source and calculates, from said second target torque, a third output torque of said driving source with the dead time in said driving source being removed, by correcting said second target torque according to a difference between said first output torque and said second output torque.

2. The output torque calculating apparatus according to claim 1, further comprising a third calculation unit that calculates an output torque that lags behind said third output torque by a predetermined time.

3. The output torque calculating apparatus according to claim 1, further comprising a learning unit that learns a correction amount corresponding to a difference between said first output torque and said second output torque for each operation state of said driving source,
    wherein said second calculation unit calculates said third output torque using the learned correction amount.

4. The output torque calculating apparatus according to claim 1, wherein
    said driving source is an internal combustion engine,
    said detection unit detects a quantity of air taken into said internal combustion engine, and
    said first calculation unit calculates the first output torque of said internal combustion engine according to the detected quantity of air.

5. An output torque calculating apparatus comprising:
    a first setting means for setting a first target torque considering torques respectively set by a plurality of systems;
    a second setting means for setting a second target torque considering a plurality of torques excluding at least any one of said torques respectively set by said plurality of systems;
    a detection means for detecting an operation state of a driving source;
    a first calculation means for calculating a first output torque of said driving source according to the operation state of said driving source; and
    a second calculating means for calculating, from said first target torque, a second output torque of said driving source in consideration of a dead time in the driving source and calculating, from said second target torque, a third output torque of said driving source with the dead time in said driving source being removed, by correcting said second target torque according to a difference between said first output torque and said second output torque.

6. The output torque calculating apparatus according to claim 5, further comprising a means for calculating an output torque that lags behind said third output torque by a predetermined time.

7. The output torque calculating apparatus according to claim 5, further comprising a means for learning a correction amount corresponding to a difference between said first output torque and said second output torque for each operation state of said driving source,
    wherein said second calculation means includes a means for calculating said third output torque using the learned correction amount.

8. The output torque calculating apparatus according to claim 5, wherein
    said driving source is an internal combustion engine,
    said detection means includes a means for detecting a quantity of air taken into said internal combustion engine, and
    said first calculation means includes a means for calculating the first output torque of said internal combustion engine according to the detected quantity of air.

* * * * *